Patented Sept. 12, 1939

2,172,833

UNITED STATES PATENT OFFICE 2,172,833

PRINTING PASTE FOR TEXTILE FABRICS

Alan A. Claflin, Winchester, Mass.

No Drawing. Application August 12, 1935,
Serial No. 35,839

2 Claims. (Cl. 8—62)

Printing pastes commonly used for imparting designs to textile fabrics consist essentially of a dyestuff to impart a color, or a chemical reagent to remove a color, or a dyestuff and a chemical agent. The purpose of the chemical reagent in such case is to either aid in fixing the dyestuff to the fibre or remove some previously affixed color or chemical agent. The paste contains a thickening agent such as starch or gum to give the proper mechanical consistency to the printing paste and also a hygroscopic agent which prevents the printed design from drying out before its color can be fixed or its function performed by a steaming process. The hygroscopic agent which has been most largely used for this purpose is glycerine, either a crude glycerine ranging from 80 to 88% pure or a high grade glycerine, such as dynamite glycerine, or even chemically pure glycerine. The usual proportion of glycerine to use is about 10% of a color paste. A typical formula for printing is as follows:

| | Parts |
|---|---|
| Dyestuff | 100 |
| Glycerine | 100 |
| Soda lye, 76° Tw | 75 |
| Glucose | 50 |
| Water | 285 |
| British gum | 250 |
| Olive oil | 30 |
| Heated to 140° F. until reduced, then cooled and | |
| Hydrosulphite NF conc. 1:1 dissolved in gum solution | 50 |
| Potassium sulphite, 91° Tw. (added) | 50 |
| | 1000 |

In place of the glycerine, the diatomic alcohols, ethylene glycol and di-ethylene glycol have been used to some extent and also tri-ethylolamine, which is a very hygroscopic substance, has been suggested.

I have found that if a solution of sodium lactate is used in place of glycerine improved results are obtained. Sodium lactate is an extremely deliquescent and hygroscopic salt, so much so that it is rarely known in a pure state, nor can it exist as such under ordinary atmospheric conditions. In solution it is, however, readily prepared by neutralizing pure or commercial lactic acid with caustic soda or sodium carbonate, or, in the process of manufacture of lactic acid, by treating the calcium lactate therein occurring with sodium carbonate. However obtained, the sodium lactate should be preferably concentrated to a solution containing not over 30 or 40% of water, in fact the less water it contains within due limits, the better.

The advantage of having a concentrated solution of sodium lactate is that as the total volume of the printed paste is limited, the less water present with sodium lactate, the more can be added to dissolve other ingredients. The purpose of using the sodium lactate is not only to replace one hygroscopic substance with another, which purpose sodium lactate adequately performs, but also to produce an important benefit. Glycerine, ethylene glycol, etc. have a certain liquefying action on the color pastes, in fact it has been claimed by some that this liquefying action was a solvent action and desirable. Sodium lactate has exactly the opposite effect, instead of a liquefying action in the color paste it has a thickening effect, and, whereas it is hypothetically possible that there might be some cases in which a solvent action is desirable, in every case tried in practice the thickening action of the sodium lactate was found desirable in that it enabled a smaller percentage of thickening agent to be used and that the resulting color yield is greater than when glycerine is used. A typical color paste prepared with sodium lactate solution is as follows:

| | Parts |
|---|---|
| Dyestuff | 100 |
| Sodium lactate 66% | 100 |
| Soda lye, 76° Tw | 75 |
| Glucose | 50 |
| Water | 325 |
| British gum pdr | 200 |
| Olive oil | 30 |
| Heated to 140° F. until reduced, then cooled and | |
| Hydrosulphite NF conc. 1:1 dissolved in gum solution | 50 |
| Potassium sulphite, 91° Tw. (added) | 60 |
| | 1000 |

Having thus fully described my invention, I claim:

1. A textile fabric printing paste, of the class described, wherein the color is fixed on the fabric by a steaming process, said paste including a dyestuff and sodium lactate as a combined medium for thickening the paste to add to its mechanical consistency, and for preventing the printed design from drying out before its color can be fixed by the steaming process.

2. A textile fabric printing paste of the class described wherein the color is fixed on the fabric by a steaming process, said paste including a dyestuff, a thickening agent for adding to the mechanical consistency of the paste, and sodium lactate, the sodium lactate assisting the thickening agent in adding to the mechanical consistency of the paste and preventing the printed design from drying out before its color can be fixed by the steaming process.

ALAN A. CLAFLIN.